Patented June 1, 1954

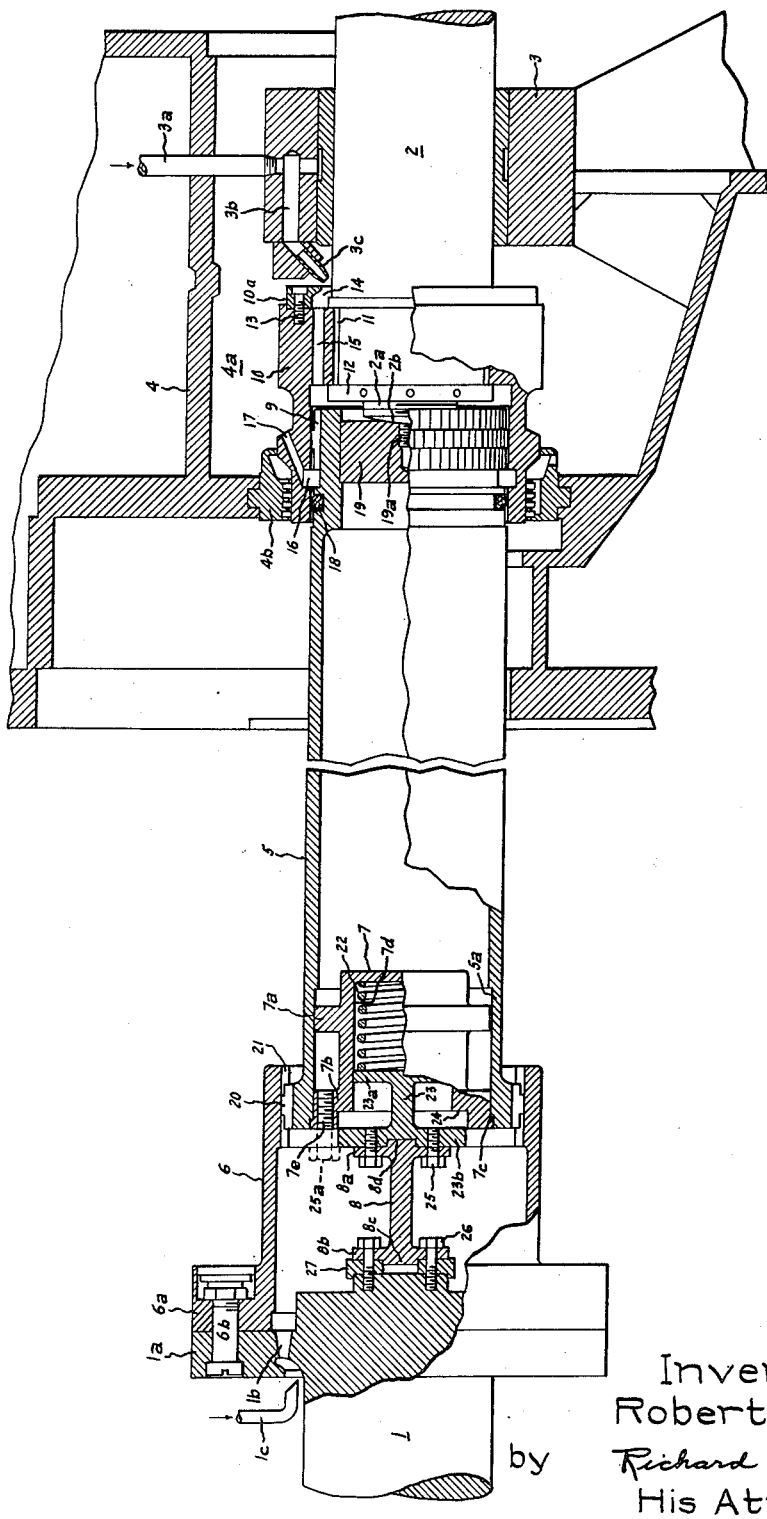
Inventor:
Robert L. Morey,
by Richard E. Hosley
His Attorney.

2,679,734

UNITED STATES PATENT OFFICE 2,679,734

SELF-ALIGNING COUPLING

Robert L. Morey, Swampscott, Mass., assignor to General Electric Company, a corporation of New York Application April 26, 1952, Serial No. 284,603

4 Claims. (Cl. 64—9)

This invention relates to self-aligning couplings, particularly to a heavy duty coupling for connecting the output shaft of a gas turbine powerplant with a power-consuming machine or a reduction gear for driving such machine.

The application for which the present invention was particularly designed is connecting a gas turbine rotor to a reduction gear driving generators in a gas turbine-electric locomotive. In such an installation, the powerplant is mounted on a mobile frame which is subject to rather substantial bending and twisting deformations in service. The resulting angular distortion between the frame of the gas turbine and the frame of the reduction gear or power consumer to which it is connected renders particularly difficult the task of providing a suitable coupling for connecting the shafts of the respective components. The shaft of the gas turbine itself is subject to substantial axial movement, perhaps on the order of ¾ inch. This is due to thermal expansion of the rotor and to the necessity for adjusting the rotor axially to vary the bucket-to-nozzle clearances in the gas turbine, but also to the fact that, when the locomotive runs up against a "bumper" at the end of a siding, the inertia of the massive gas turbine rotor causes it to suddenly move axially a small but significant distance. Thus, it will be seen that the flexible coupling for such service must be capable of providing for very substantial relative displacements, both angularly and axially, in addition to the "offset" type of displacement in which one rotor is displaced parallel to the other so that the two shafts are no longer coaxial.

Accordingly, the purpose of the present invention is to provide an improved self-aligning shaft coupling arranged to permit the above-described types of misalignment and relative movement.

A further object is to provide a self-aligning shaft coupling of the type described which may be disassembled and removed from between the spaced shafts to which it is connected without disturbing the axial position of either shaft.

Other objects and advantages will become apparent from the following description, taken in connection with the accompanying drawing in which the single figure represents a sectional view of a shaft coupling assembly incorporating the invention.

Generally, the invention is practiced by providing a torque tube having a spline at either end thereof. One splined end engages the shaft of the power receiving machine. The other end spline engages an axially slidable sleeve member which is normally bolted to the power generating machine shaft. Spring means disposed within the coupling sleeve biases the torque tube axially so that the splined teeth at the other end of the shaft are maintained in proper axial alignment. A removable spacer member within the coupling sleeve transmits axial motion from the power input shaft to the biasing spring.

Referring now more particularly to Fig. 1, the invention is illustrated as applied to a coupling for connecting the power output shaft 1 of a gas turbine plant (not shown) to the input shaft 2 of a reduction gear. The reduction gear pinion shaft 2 is shown supported in a conventional journal bearing 3, supplied with lubricating oil by a conduit 3a. The reduction gear housing 4 defines a chamber 4a surrounding the coupling and shaft end portions, and has a suitable labyrinth seal member 4b arranged to prevent the escape of oil vapor from chamber 4a.

The self-aligning coupling assembly comprises the torque tube 5, the coupling sleeve member 6, the biasing spring cylinder assembly 7, and the removable spacer member 8.

The power output or right-hand end of torque tube 5 has a circumferential row of external spline teeth 9 mating with internal spline teeth formed in the bore of a first coupling sleeve member 10, which is in turn connected to shaft 2 by spline or key means 11 and a retaining nut member 12 carried on a reduced diameter threaded end portion 2a of the shaft 2. It is to be noted that shaft portion 2a has a spherical end thrust portion 2b, the function of which will be pointed out more particularly hereinafter.

At its right-hand end, the first coupling sleeve 10 carries a removable ring 10a secured to the coupling sleeve by a plurality of threaded fastenings 13 and defining an annular oil inlet chamber 14. It will readily be apparent from the drawing that oil supplied through conduit 3a is communicated by a drilled passage 3b in the bearing housing to an oil supply nozzle 3c which directs a jet of lubricant into the chamber 14, from where it passes by way of a plurality of axial holes 15 so as to lubricate the spline teeth 9. Spent lubricant is discharged from the annular drain chamber 16 defined between the coupling sleeve and torque tube at the exit end of the spline teeth, this oil being discharged by way of a plurality of radially and axially extending passages 17. This oil is of course returned by suitable scavenging conduits (not shown) to the lubrication system. It will be seen that the labyrinth seal member 4b cooperates with the external circumferential surface of sleeve 10. To prevent escape of oil from chamber 16 to the left through the clearance space between sleeve 10 and torque tube 5, a suitable sealing member, such as the "O-ring" 18, is disposed between tube and sleeve.

Seated in the right-hand end of torque tube 5 is a cylindrical thrust block member 19 adapted to abut the spherical end thrust portion 2b of the shaft 2. Thrust block 19 may be secured in the torque tube by a shrink fit, and is provided with a threaded central bore 19b into which a threaded tool may be inserted for the purpose of removing the block.

The external spline teeth 20 provided at the left-hand end of torque tube 5 engage internal teeth 21, formed in the second coupling sleeve member 6. It will be observed that teeth 21 are of sufficient axial length relative to teeth 20 that they will remain in driving engagement even though the coupling sleeve 6 should slide axially a substantial distance relative to the torque tube. The left-hand end of coupling sleeve 6 is provided with a radially extending flange 6a secured by a plurality of bolts 6b to the driving flange 1a of the power input shaft 1. Flange 1a is provided with a number of circumferentially spaced oil inlet passages 1b to which lubricant is supplied by a nozzle 1c. Oil admitted by passages 1b travels axially along the inner surface of coupling sleeve 6 to lubricate the teeth 20, 21.

The function of the biasing spring cylinder 7 is to insure that the torque tube 5 will be resiliently maintained at the right-hand end of its range of movement with thrust block 19 seated solidly against the thrust surface 2b of shaft 2. It will be seen from the drawing that the spring cylinder has a radially extending flange 7a with its circumferential surface slidably disposed in an axial bore 5a in the torque tube. The other end of cylinder 7 has a second radial flange portion 7b with a rabbeted portion 7c determining the position of cylinder 7 in torque tube 5. The cylinder 7 defines a spring chamber 7d in which is disposed the heavy biasing coil spring 22. Engaging the free end of spring 22 is the spring piston 23 which has a right-hand end flange 23a loosely fitting the bore 7d. At its left-hand end, spring piston 23 has a second end flange 23b, which in normal operation is disposed as shown relative to the spring cylinder 7, but is adapted to be forced into a rabbeted recess 24 in the adjacent end of the spring cylinder, as required in the disassembly process as described hereinafter.

The removable spacer member 8 has a right-hand end flange 8a adapted to be secured by threaded fastenings 25 to flange 23b. The left-hand end of spacer 8 has a similar flange 8b secured by threaded fastenings 26 to the adjacent end of input shaft 1, with a spacer washer 27 disposed therebetween. It will also be observed that spacer 8 has end rabbet portions 8c, 8d seated in mating recesses in the spacer washer 27 and the spring piston end flange 23b.

With this arrangement, it will be seen that, in normal operation, coil spring 22, acting on the spring piston 23 and the spring cylinder member 7, causes the torque tube 5 to be strongly biased to the right so that the right-hand end spline teeth 9 will be accurately located axially by engagement of the thrust block 9 with the spherical shaft end portion 2b. Angular and offset misalignment between the shafts 1 and 2 will be permitted by the spaced splines 20, 21 and 9 respectively, in a manner which will be obvious to those skilled in the art.

It is to be especially noted that, in the event shaft 1 moves suddenly to the right, as for instance under the influence of the shock load when the locomotive strikes a track bumper, only the coupling sleeve 6, the spacer member 8, and spring piston 23 share such movement. The comparatively more massive torque tube 5 and the coupling members associated with the right-hand end thereof remain in their original axial position with thrust block 19 against the shaft end portion 2b. Thus, only a minimum mass of the coupling parts share the sudden axial displacement of the gas turbine shaft 1 caused when the locomotive strikes a bumper.

The manner in which the coupling assembly is disassembled will be seen from the following.

The gas turbine coupling flange bolts 6b are first removed and the coupling sleeve 6 caused to slide axially to the right, so that the teeth 20, 21 are disengaged and the sleeve is disposed loosely around the torque tube 5. This gives access in a radial direction to the spacer member 8, whereupon the threaded fastenings 25 are removed from the position shown in full lines in the drawing and inserted into threaded holes 7e provided in the end flange 7b of the spring cylinder. One fastening is shown in such position in dotted lines in the drawing. It will be observed that the heads of the fastening members overlap the adjacent edge of spring piston flange 23b. Thus, by turning these screws into the threaded holes 7e, the spring piston 23 can be forced into the spring cylinder against the bias of spring 22 until the spring piston end flange 23b occupies the rabbet 24 in the adjacent end of the spring cylinder. This provides sufficient clearance that the threaded fastenings 26 may be removed, the spacer member 8 moved axially a distance to permit the washer 27 to be removed, so that spacer 8 may be freely removed from its assembled position between shaft 1 and the spring piston 23. This in turn provides sufficient axial clearance so that the torque tube assembly 5, with the spring piston 23 seated within the cylinder 7, may be moved axially to the left so the right-hand end spline teeth 9 disengage the coupling sleeve 10, and the entire torque tube assembly can then be removed from between shafts 1 and 2.

Thus, it will be seen that the invention provides a simple and rugged self-aligning coupling assembly which has comparatively light parts so that centrifugal forces will not create excessive unbalance due to the eccentricity and angularity to which the various components of the coupling may be subjected, at the same time having the minimum number of coupling components subjected to sudden axial displacements of the power input shaft. The torque tube is firmly held in abutting relation with the power output shaft, so that it does not share axial displacements of the power input shaft. At the same time, the arrangement provides means for readily removing the coupling assembly from between the power input and power output shafts without disturbing the axial position of either.

While only one form of the invention has been described specifically herein, it will be apparent to those skilled in the art that many changes and substitutions of mechanical equivalents may be made without departing from the invention, and it is of course desired to cover by the appended claims all such modifications as fall within the true spirit and scope of the invention.

What I claim as new and desire to secure by Letters Patent of the United States is:

1. In a self-aligning coupling, the combination of a torque-tube member having a first end portion adapted to be connected in torque-transmitting relation with a first rotor end portion, said first torque tube end portion having a member adapted to abut an adjacent end portion of said first rotor, a coupling sleeve member adapted to be secured to the end of a second shaft spaced axially from the first shaft, said coupling sleeve having spline teeth engaging cooperating spline teeth on the adjacent end of the torque tube, said splined end of the torque tube adjacent the second shaft defining a cylindrical recess, a cup-shaped spring cylinder member disposed in said recess with the open end thereof facing said second shaft end portion, a coil spring disposed in said cylinder, a spring piston member having a first end portion engaging the free end of the spring and an end flange adapted to be disposed just outside the spring cylinder in normal operation and to be retracted into the cylinder against the bias of the spring during disassembly of the coupling, a spacer member disposed between the second shaft and the end flange of the spring piston and having end portions adapted to be secured to the second shaft portion and spring piston respectively, a plurality of threaded screw members securing said spacer to the spring piston end flange, the spring cylinder end portion adjacent the spacer having a plurality of circumferentially spaced threaded holes disposed immediately surrounding the spring piston end flange, whereby in disassembly said screws can be removed from the spacer and inserted in said threaded holes with the heads thereof overlying the circumferential edge of the spring piston flange, whereupon the piston may be retracted into the cylinder against the bias of the spring by turning said screws, after which the spacer member may be removed from the second shaft and the torque tube caused to slide axially toward the second shaft to disengage the tube from the first shaft.

2. In a self-aligning coupling for connecting a first rotor end portion to a second axially spaced shaft, the combination of a torque-tube member having a first end portion adapted to be connected in torque-transmitting relation with the first rotor end portion, said first tube end portion having a member adapted to abut an adjacent end portion of said first rotor to determine the axial location of the tube, a coupling sleeve member adapted to be secured to the end of the second shaft, said sleeve having spline teeth engaging cooperating spline teeth on the adjacent end of the torque tube, said splined end of the tube having a portion defining a cylindrical recess facing the second shaft, a coil spring disposed in said recess, a spring piston member having a first end portion engaging the free end of the spring and an end flange adapted to be disposed just outside the cylindrical recess in normal operation and to be retracted into the recess against the bias of the spring during disassembly of the coupling, a spacer member disposed between the second shaft and the end flange of the spring piston and having end portions adapted to be secured to the second shaft and spring piston end flange respectively, a plurality of threaded screw members securing said spacer to the spring piston end flange, the torque-tube end portion having a plurality of circumferentially spaced threaded holes disposed immediately surrounding the spring piston end flange, whereby in disassembly screws may be inserted in said threaded holes with the heads thereof overlying the circumferential edge of the spring piston flange, whereupon the piston may be retracted into the recess against the bias of the spring by turning said screws, after which the spacer member may be removed from the second shaft and the torque tube caused to slide axially toward the second shaft to disengage the tube from the first shaft.

3. In a self-aligning coupling for connecting a first rotor end portion to a second axially spaced shaft, the combination of a torque-tube member having a first end portion adapted to be connected in torque-transmitting relation with the first rotor end portion, said first tube end portion having a member adapted to abut an adjacent end portion of said first rotor to determine the axial location of the tube, a coupling sleeve member adapted to be secured to the end of the second shaft, said sleeve member having spline teeth engaging cooperating spline teeth on the adjacent end of the torque tube, said splined end of the tube having a central portion defining a cylindrical recess facing the second shaft, a spring disposed in said recess, a spring piston member having a first end portion engaging the free end of the spring and an end flange adapted to be disposed just outside the recess in normal operation and to be retracted into the recess against the bias of said spring during disassembly of the coupling, a spacer member disposed between the end of the second shaft and the end flange of the spring piston and having end portions detachably secured to the second shaft and spring piston end flange respectively, and means for retracting said spring piston into said recess so the spacer member may be removed from the second shaft and the torque tube caused to slide axially toward the second shaft to disengage the tube from the first shaft.

4. In a self-aligning coupling for connecting a first rotor end portion to a second axially spaced shaft, the combination of a torque-tube member having a first end portion adapted to be connected in torque-transmitting relation with the first rotor end portion, a stop means for limiting axial sliding movement of the torque tube towards said first rotor end portion, a coupling sleeve member adapted to be secured to the end of the second shaft, said sleeve member having spline teeth engaging cooperating spline teeth on the adjacent end of the torque tube, said splined end of the tube having a portion defining a central recess facing the second shaft, spring means disposed in said recess, a spring piston member having a first end portion engaging the spring means and a second end portion adapted to be disposed just outside said recess in normal operation and to be retracted into the recess against the bias of the spring means during disassembly of the coupling, and a spacer member disposed between the end of the second shaft and said second end portion of the spring piston and having end portions detachably secured to the second shaft and spring piston respectively.

References Cited in the file of this patent

UNITED STATES PATENTS

| Number | Name | Date |
|---|---|---|
| 1,835,506 | Linn | Dec. 8, 1931 |
| 1,862,099 | Sheldrick | June 7, 1932 |